United States Patent
Adachi

(10) Patent No.: US 8,171,213 B2
(45) Date of Patent: May 1, 2012

(54) INFORMATION PROCESSING APPARATUS AND METHOD, AND PROGRAM

(75) Inventor: Naohiro Adachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 12/104,735

(22) Filed: Apr. 17, 2008

(65) Prior Publication Data

US 2008/0263307 A1    Oct. 23, 2008

(30) Foreign Application Priority Data

Apr. 20, 2007   (JP) ................ P2007-111123

(51) Int. Cl.
  G06F 13/00   (2006.01)
  G06F 13/28   (2006.01)
(52) U.S. Cl. .......................... 711/112; 710/22
(58) Field of Classification Search .................. None
  See application file for complete search history.

(56) References Cited

U.S. PATENT DOCUMENTS

2008/0301256 A1* 12/2008 McWilliams et al. ........ 709/214
2010/0011187 A1*  1/2010 Schoinas et al. ............. 711/206

FOREIGN PATENT DOCUMENTS

| JP | 2002-366507 | 12/2002 |
| JP | 2004 46891  | 2/2004  |
| JP | 2006-18642  | 1/2006  |

* cited by examiner

*Primary Examiner* — Brian Peugh

(74) *Attorney, Agent, or Firm* — Frommer Lawrence & Haug LLP; William S. Frommer

(57) ABSTRACT

Disclosed herein is an information processing apparatus, including: setting means for setting, a maximum transfer size; calculation means for subtracting a second data amount from a first data amount to calculate a third data amount; boundary determination means for determining whether this transfer will involve a page boundary being extended across; buffer boundary determination means for determining whether this transfer will involve a buffer size being exceeded; transfer size determination means for determining whether or not the third data amount is equal to or less than the maximum transfer size; and determination means for determining a data amount of data to be transferred within limits of the third data amount, based on a first determination made by the boundary determination means, a second determination made by the buffer boundary determination means, and a third determination made by the transfer size determination means.

9 Claims, 12 Drawing Sheets

FIG.4

| 31 | | 0 |
|---|---|---|
| TRANSFER ADDRESS | | |
| TRANSFER ADDRESS | | |
| RESERVED | TRANSFER SIZE | |
| EOT | RESERVED | |

FIG.5

| MAX READ REQUEST SIZE | MAXIMUM TRANSFER SIZE |
|---|---|
| 128 BYTES | 128 BYTES |
| 256 BYTES | 256 BYTES |
| 512 BYTES | 512 BYTES |
| 1024 BYTES | 1024 BYTES |
| 2048 BYTES | 2048 BYTES |
| 4096 BYTES | 2048 BYTES |

| MAX PAYLOAD SIZE | MAXIMUM TRANSFER SIZE |
|---|---|
| 128 BYTES | 128 BYTES |
| 256 BYTES | 256 BYTES |
| 512 BYTES | 512 BYTES |

INFORMATION PROCESSING APPARATUS AND METHOD, AND PROGRAM

CROSS REFERENCES TO RELATED APPLICATIONS

The present invention contains subject matter related to Japanese Patent Application JP 2007-111123, filed in the Japan Patent Office on Apr. 20, 2007, the entire contents of which being incorporated herein by reference.

BACKGROUND OF THE INVENTION

1. Field of the Invention

The present invention relates to an information processing apparatus and method, and a program therefor. In particular, the present invention relates to an information processing apparatus and method, and a program therefor which are suitable for use when transferring information.

2. Description of the Related Art

A data processing apparatus to which a memory card containing a memory or the like is to be connected is known (see, Japanese Patent Laid-open No. 2004-46891, for example).

A direct memory access (DMA) controller is known that is used for data transfer between a host and storage. Direct memory access refers to transferring data directly between different memories or between a memory and an I/O device, without depending on a collection of machine language instructions. The DMA controller is a controller for controlling a DMA function.

When data is transferred using the DMA function, a descriptor is used. Data transfer control information, such as a data transfer address and a data transfer size, is described in the descriptor.

A transfer method that involves the use of the descriptor is, for example, suitably used for data transfer in the case of a discrete physical address space managed on a page-by-page basis as in a memory system used in a personal computer or the like, i.e., in the case where pieces of information that are defined as being stored in a continuous logical address space are stored discretely in an actual physical address space (see FIG. 1).

SUMMARY OF THE INVENTION

As an interface for connecting a host and storage with each other, a high-speed bus called Peripheral Components Interconnect (PCI) Express is widely used. The PCI Express is a packet-based bus interface. In the packet-based bus interface, it is necessary to determine a transfer size when issuing a packet.

For example, in the case of non-packet-based bus interfaces, such as Advanced Microcontroller Bus Architecture (AMBA), Advanced High-Performance Bus (AHB), and Advanced Peripheral Bus (APB), it is possible to suspend DMA data transfer halfway and resume it again. On the other hand, in the case of the packet-based bus interface such as the PCI Express, it is not possible to suspend the DMA data transfer halfway and resume it again.

Accordingly, when the packet-based bus interface is used, it is necessary to determine the transfer size when issuing the packet. Further, in the case where a large amount of data is transferred, it is necessary to divide the data before transferring it. In related art, at the time of data transfer, the host needs to perform scheduling related to the data transfer taking account of specifications of the bus, and generate descriptors based on the scheduling.

The present invention has been devised in view of such a situation, and makes it possible to reduce processing to be performed in the host at the time of data transfer.

According to one embodiment of the present invention, there is provided an information processing apparatus including: setting means; calculation means; boundary determination means; buffer boundary determination means; transfer size determination means; and determination means. The setting means sets, as a maximum transfer size, a maximum transfer size at the time of reading or a maximum transfer size at the time of writing set in connection with another apparatus. The calculation means subtracts a second data amount from a first data amount to calculate a third data amount, the first data amount being an amount of data to be transferred, the second data amount being an amount of data that has been transferred. The boundary determination means determines whether, if data whose amount is the third data amount is transferred, this transfer will involve a page boundary being extended across. The buffer boundary determination means determines whether, if the data whose amount is the third data amount is transferred, this transfer will involve a buffer size being exceeded. The transfer size determination means determines whether or not the third data amount is equal to or less than the maximum transfer size set by the setting means. The determination means determines a data amount of data to be transferred within limits of the third data amount, based on a first determination made by the boundary determination means, a second determination made by the buffer boundary determination means, and a third determination made by the transfer size determination means.

According to another embodiment of the present invention, there is provided an information processing method including the steps of: setting; subtracting; determining; another determining; further determining; and still further determining. The setting step sets as a maximum transfer size, a maximum transfer size at the time of reading or a maximum transfer size at the time of writing set in connection with another apparatus. The subtracting step subtracts a second data amount from a first data amount to calculate a third data amount, the first data amount being an amount of data to be transferred, the second data amount being an amount of data that has been transferred. The determining step determines whether, if data whose amount is the third data amount is transferred, this transfer will involve a page boundary being extended across. The another determining step determines whether, if the data whose amount is the third data amount is transferred, this transfer will involve a buffer size being exceeded. The further determining step determines whether or not the third data amount is equal to or less than the maximum transfer size set in the setting. The still further determining step determines a data amount of data to be transferred within limits of the third data amount, based on results of those determinations.

According to yet another embodiment of the present invention, there is provided a computer-readable program including the steps of: setting, subtracting, determining, another determining, further determining, and still further determining. The setting step sets as a maximum transfer size, a maximum transfer size at the time of reading or a maximum transfer size at the time of writing set in connection with another apparatus. The subtracting step subtracts a second data amount from a first data amount to calculate a third data amount, the first data amount being an amount of data to be transferred, the second data amount being an amount of data that has been transferred. The determining step determines whether, if data whose amount is the third data amount is transferred, this transfer will involve a page boundary being extended across. The another determining step determines whether, if the data whose amount is the third data amount is transferred, this transfer will involve a buffer size being exceeded. The further determining step determines whether or not the third data amount is equal to or less than the maximum transfer size set in the setting. The still further determining step determines a data amount of data to be transferred within limits of the third data amount, based on results of those determinations.

In the information processing apparatus and method, and the program each according to one embodiment of the present invention, connection is established with a host system, a size at the time of data transfer is specified from the host system, and transfer of data having that size is performed while at least a page boundary, and a buffer boundary are taken account of. When necessary, this data is divided into parts and the parts are transferred separately.

According to the above-described embodiments of the present invention, the amount of processing that needs to be performed in the host system at the time of data transfer can be reduced, for example.

BRIEF DESCRIPTION OF THE DRAWINGS

FIG. 4 is a diagram for describing a command;

FIG. 5 is a diagram for describing a transfer ability;

DETAILED DESCRIPTION OF THE PREFERRED EMBODIMENTS

Figure 1:
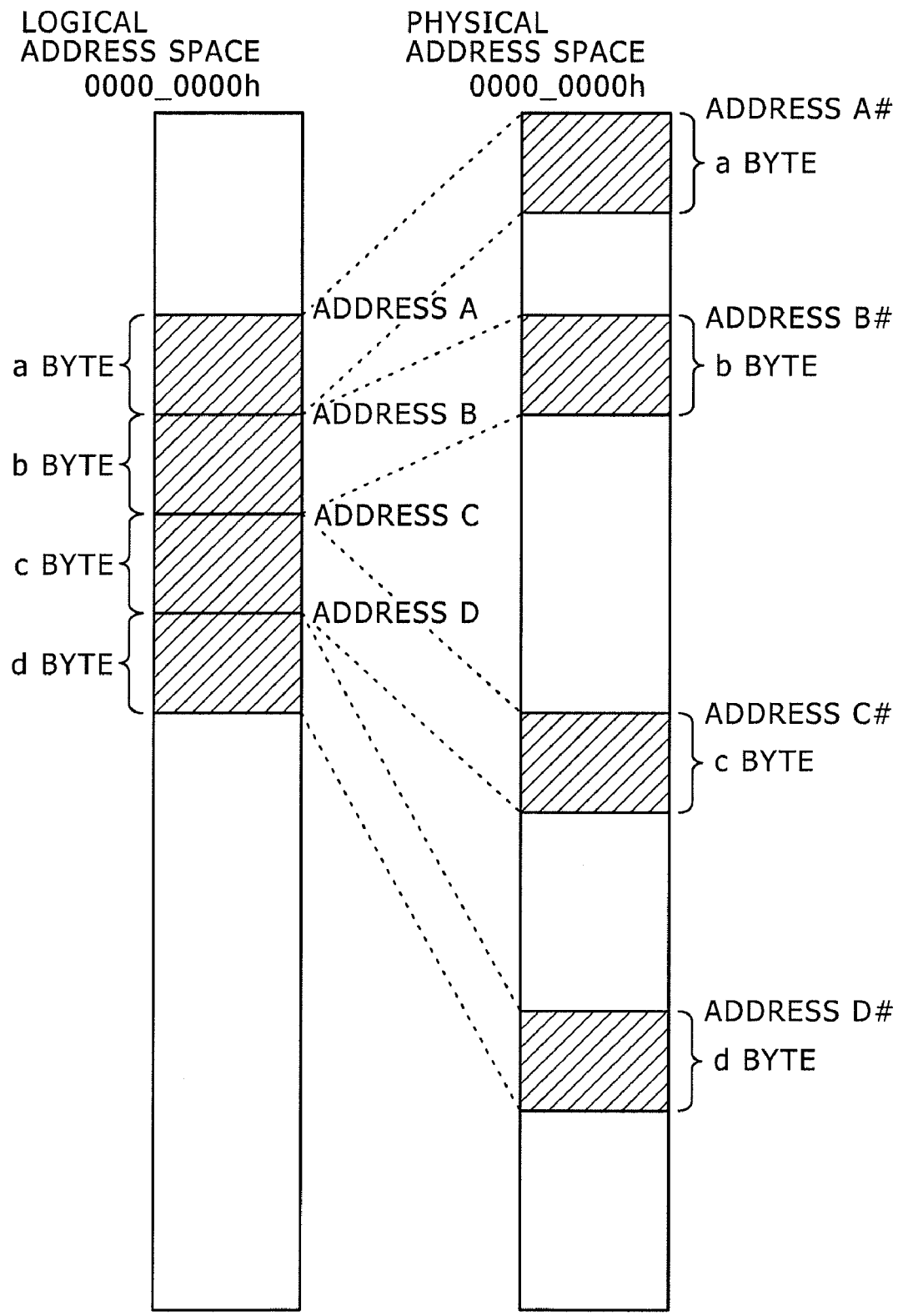
FIG. 1 is a diagram for explaining about a logical address space and a physical address space.

Hereinafter, embodiments of the present invention will be described. Correspondence between the constituent features of the present invention and the embodiment that will be described below in this specification taken in conjunction with the accompanying drawings is exemplified as follows. Note that this preliminary description is meant to confirm that an embodiment that supports the present invention is described in this specification and the accompanying drawings. Therefore, even if there is an embodiment that is described in this specification and the accompanying drawings but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

An information processing apparatus according to one embodiment of the present invention includes: setting means; calculation means; boundary determination means; buffer boundary determination means; transfer size determination means; and determination means. The setting means (e.g., a maximum transfer size determination circuit 101 shown in FIG. 7) sets, as a maximum transfer size, a maximum transfer size at the time of reading or a maximum transfer size at the time of writing set in connection with another apparatus. The calculation means (e.g., a subtractor 107 shown in FIG. 7) subtracts a second data amount from a first data amount to calculate a third data amount, the first data amount being an amount of data to be transferred, the second data amount being an amount of data that has been transferred; buffer boundary determination means. The boundary determination means (e.g., a 4K boundary determination circuit 102 shown in FIG. 7) determines whether, if data whose amount is the third data amount is transferred, this transfer will involve a page boundary being extended across. The buffer boundary determination means (e.g., a buffer boundary determination circuit 103 shown in FIG. 7) determines whether, if the data whose amount is the third data amount is transferred, this transfer will involve a buffer size being exceeded. The transfer size determination means (e.g., a transfer size determination circuit 104 shown in FIG. 7) determines whether or not the third data amount is equal to or less than the maximum transfer size set by the setting means. The determination means (e.g., a priority determination circuit 105 shown in FIG. 7) determines a data amount of data to be transferred within limits of the third data amount, based on a first determination made by the boundary determination means, a second determination made by the buffer boundary determination means, and a third determination made by the transfer size determination means.

Hereinafter, embodiments of the present invention will be described with reference to the accompanying drawings.

[On System Configuration]

Figure 2:
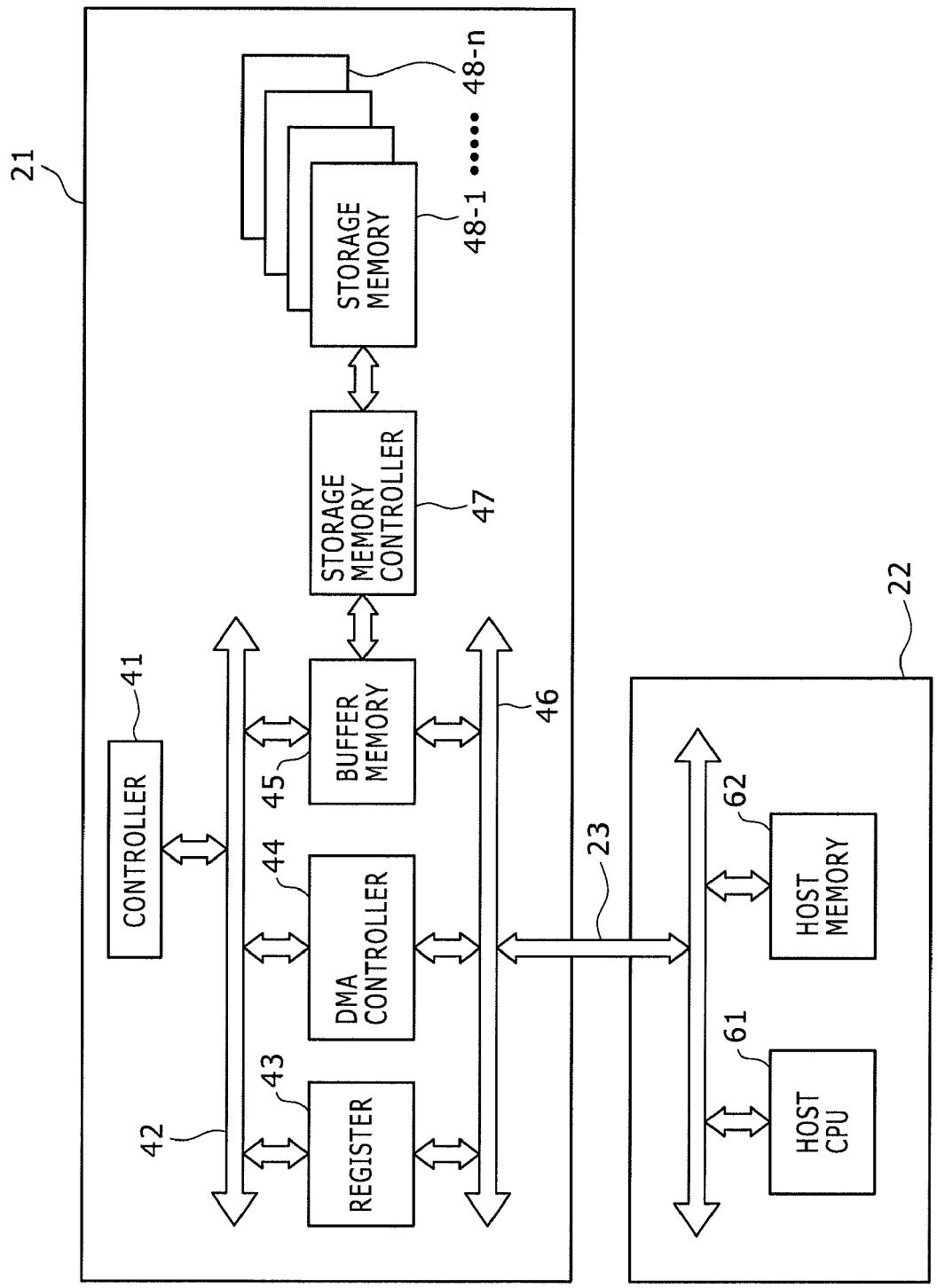
FIG. 2 is a block diagram illustrating a configuration of a host system and a storage system according to one embodiment of the present invention.

FIG. 2 is a block diagram illustrating the configuration of a host system and a storage system according to one embodiment of the present invention.

The storage system 21 and the host system 22 are connected to each other via a storage I/F 23. Preferably, a high-speed bus such as Peripheral Components Interconnect (PCI) Express is used for the storage I/F 23.

The storage system 21 includes a controller 41, an internal bus 42, a register 43, a DMA controller 44, a buffer memory 45, a storage I/F bus 46, a storage memory controller 47, and storage memories 48-1 to 48-n.

The controller 41 controls an operation of the storage system 21. For example, the controller 41 controls the storage memory controller 47 to perform processes such as writing or reading data to or from the storage memories 48-1 to 48-n or configuring the DMA controller 44 based on a command that has been supplied from the host system 22 and written to the register 43.

The controller 41, the register 43, the DMA controller 44, and the buffer memory 45 are connected to the internal bus 42. The register 43 may be composed of a plurality of registers. The register 43 holds the command or a descriptor supplied from the host system 22 via the storage I/F 23 and the storage I/F bus 46, or information, an argument, or the like necessary for a transfer process or other processes.

The DMA controller 44 controls exchange of data between the buffer memory 45 in the storage system 21 and a host memory 62 in the host system 22. A link list transfer mode is set in the DMA controller 44. The link list transfer mode refers to a mode in which an address of a link list composed of a plurality of descriptors (also referred to as "entries") is supplied from the host system 22 to the register 43 in the storage system 21, and the storage system 21 reads this link list to perform the transfer process.

The link list transfer mode can be suitably applied when a physical address space in the host memory 62 of the host system 22 is managed on a page-by-page basis as described above with reference to FIG. 1, i.e., when the physical address space is not continuous like a logical address space but is set discretely.

The buffer memory 45 temporarily buffers data supplied from the host system 22 via the storage I/F 23 and the storage I/F bus 46, or data that is, under control of the storage memory controller 47, read from one of the storage memories 48-1 to 48-n and supplied to the host system 22 via the storage I/F 23 and the storage I/F bus 46.

The storage I/F bus 46 is a bus used to connect the register 43, the DMA controller 44, and the buffer memory 45 to the storage I/F. Under control of the controller 41, the storage memory controller 47 controls writing and reading of data to or from the storage memories 48-1 to 48-n. The storage memory controller 47 writes and reads data to or from the storage memories 48-1 to 48-n. In the following descriptions, the storage memories 48-1 to 48-n will be referred to simply as a "storage memory 48" unless they need to be differentiated from one another.

The host system 22 includes a host CPU 61 and the host memory 62. Needless to say, the host system 22 may additionally include other components such as a communication section, a display section, an operation input section, an imaging section, an audio acquisition section, and a data compression section. As the host system 22, various types of information processing apparatuses, such as a common personal computer, a digital still camera, and a digital video camera, can be used, for example.

The host CPU 61 controls an operation of the host system 22. Based on a user operation inputted via the operation input section (not shown), for example, the host CPU 61 is capable of generating the command and writing the command to the register 43 in the storage system 21 via the storage I/F 23. Examples of such commands include: a command for writing data stored in the host memory 62 to the storage memory 48 in the storage system 21; commands related to data exchange between the storage system 21 and the host system 22, such as a command for reading the data from the storage memory 48 in the storage system 21 and storing the read data in the host memory 62; and commands for controlling the storage memory 48, such as a command for deleting the data stored in the storage memory 48.

Under control of the host CPU 61, the host memory 62 stores predetermined data.

As described above, in the system composed of the storage system 21 and the host system 22 as shown in FIG. 2, the DMA controller for controlling DMA transfer is provided on the storage side.

The following descriptions are made with reference to an exemplary case where a data storage form adopted in the host memory 62 is a data storage form as described above with reference to FIG. 1, in which the physical address space in the host memory 62 in the host system 22 is not continuous like the logical address space but is set discretely. In other words, the following descriptions are made with reference to an exemplary case where the physical address space in the host memory 62 in the host system 22 is, unlike the logical address space, composed of a plurality of discontinuous (discrete) areas.

Figure 3:
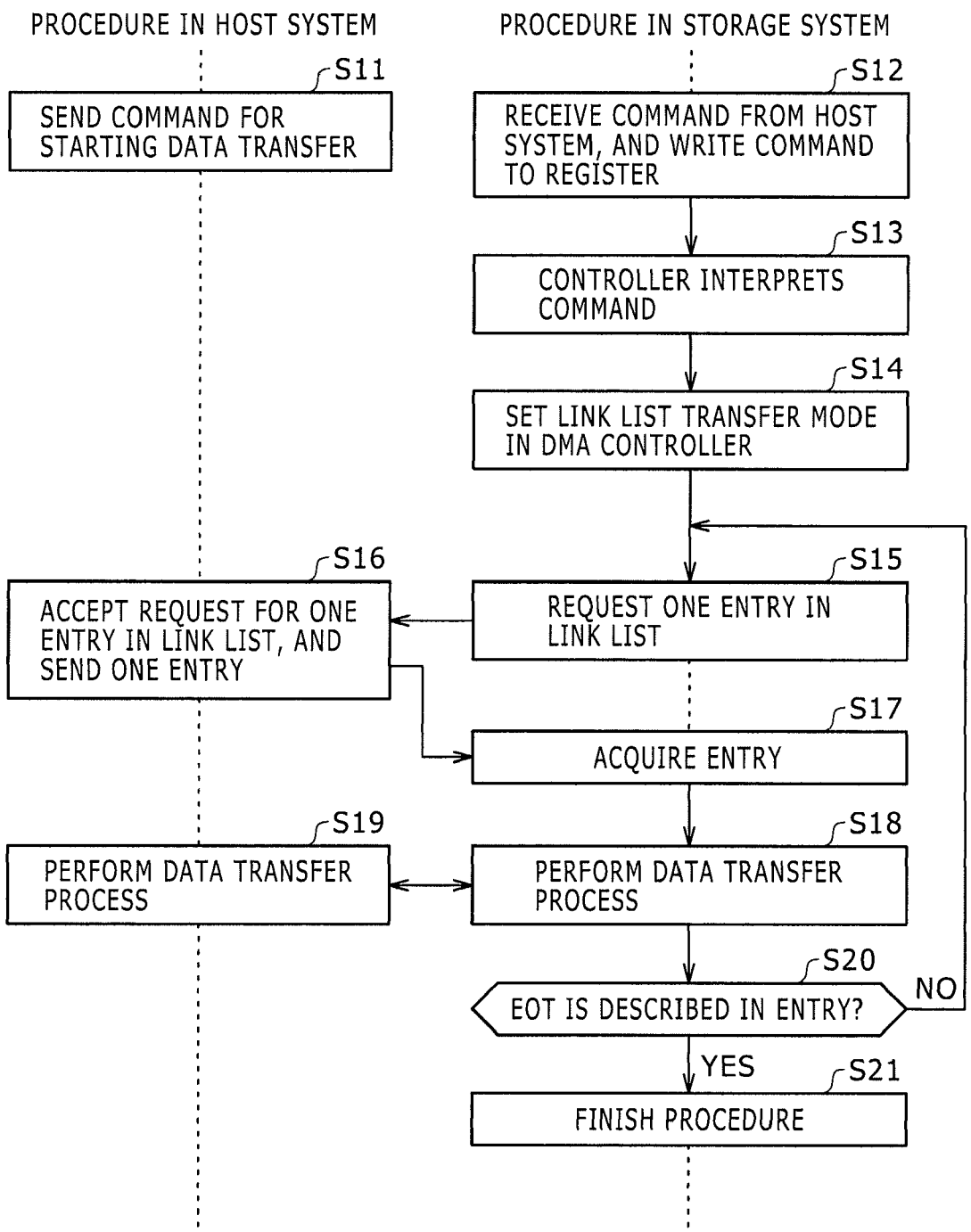
FIG. 3 is a flowchart illustrating operations of the systems.

Next, the operations of the storage system 21 and the host system 22 will be described below with reference to a flowchart of FIG. 3. At step S11, the host CPU 61 in the host system 22 transmits a command for starting data transfer to the storage system 21 via the storage I/F 23.

At step S12, the storage system 21 receives the command from the host system 22 via the storage I/F 23. The command supplied is written to the register 43 via the storage I/F bus 46.

At step S13, the controller 41 reads the command from the register 43 via the internal bus 42, and interprets the command.

It is assumed here that the command written in the register is interpreted as a command for the link list transfer mode, and that a corresponding setting is carried out. At step S14, the controller 41 sets the link list transfer mode in the DMA controller 44.

At step S15, the DMA controller 44, which has been set to the link list transfer mode, requests one entry in the link list from the host system 22 via the storage I/F 23.

At step S16, the host CPU 61 in the host system 22 accepts the request for the one entry in the link list, and sends the one entry in the link list to the storage system 21 via the storage I/F 23.

At step S17, the storage system 21 acquires the entry from the host system 22 via the storage I/F 23, and holds the entry in the register 43. At steps S18 and S19, the storage system 21 and the host system 22 perform the data transfer process.

At step S20, the controller 41 in the storage system 21 determines whether EOT is described in the entry acquired at step S17. If it is determined at step S20 that EOT is not described in the entry, control returns to step S15, and subsequent procedures repeat.

Meanwhile, if it is determined at step S20 that EOT is described in the entry, the controller 41 finishes this procedure at step S21.

In the above procedure, data transfer is performed in the link list transfer mode.

The above procedure will be described below in more detail. In the case where data stored in the host memory 62 in the host system 22 is to be written to the storage memory 48 in the storage system 21, for example, the host CPU 61 in the host system 22 transmits a write command to the register 43 via the storage I/F 23 and the storage I/F bus 46. The write command is a command for initiating a process of writing the data stored in the host memory 62 in the host system 22 to the storage memory 48 in the storage system 21. The register 43 accepts supply of this command and temporarily holds the command.

The controller 41 in the storage system 21 acquires the command held in the register 43 and interprets a content of the command. Because the storage system 21 and the host system 22 perform data transfer using the link list transfer mode as described above, the controller 41 configures the DMA controller 44 in accordance with the link list transfer mode.

Specifically, when the link list transfer mode is adopted, the host CPU 61 in the host system 22 writes an address of the link list in the host memory 62 to the register 43. Therefore, the DMA controller 44 refers to the register 43 to read one entry after another from the host memory 62, and performs the data transfer process based on the read entries. In this manner, the DMA controller 44 performs the data transfer process with respect to all entries in the link list.

Specifically, when the data stored in the host system 22 is written to the storage system 21, the DMA controller 44 reads, out of the data stored in the host memory 62, data to be written to the storage memory 48, and supplies the read data to the buffer memory 45 via the storage I/F 23 and the storage I/F bus 46. The buffer memory 45 buffers the data supplied.

Figure 7:
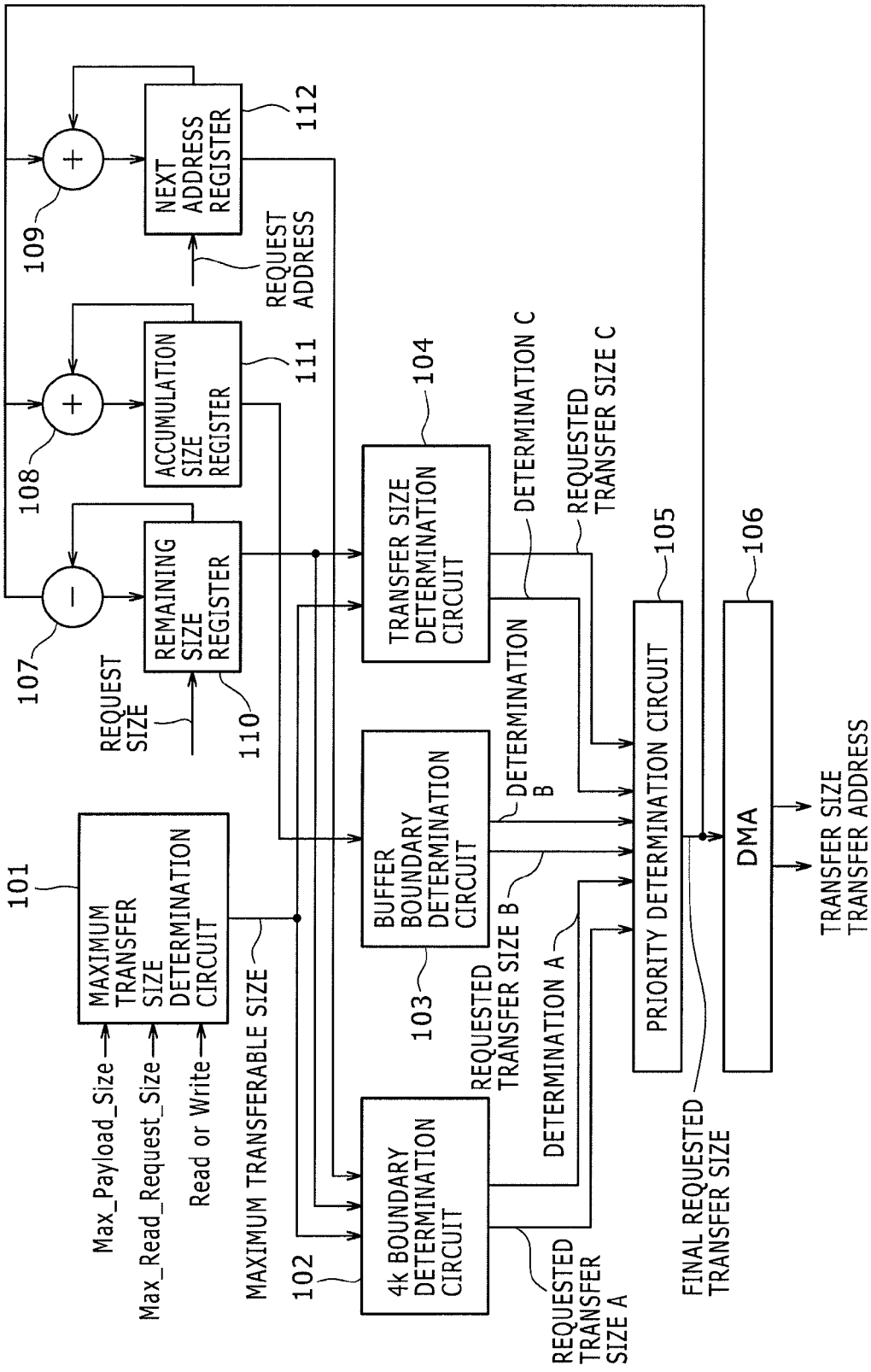
FIG. 7 is a block diagram illustrating a structure of a DMA controller according to the embodiment of the present invention.

The host system 22 needs to take account of specifications of the storage I/F or the like when generating the link list. The host system 22 according to the present embodiment, however, does not need to take account of specifications of the storage I/F 23 or the like. In order to allow the host system 22 not to take account of the specifications of the storage I/F 23, the DMA controller 44 has a structure as shown in FIG. 7. FIG. 7 will be described later.

When a content of the data stored in the buffer memory 45 becomes effective, the storage memory controller 47 starts writing the data stored in the buffer memory 45 to the storage memory 48. On the other hand, in the case where the data stored in the storage memory 48 in the storage system 21 is read and stored in the host memory 62 in the host system 22, for example, the host CPU 61 in the host system 22 sends a read command to the register 43 via the storage I/F 23 and the storage I/F bus 46. The read command is a command for initiating a process of reading the data from the storage memory 48 in the storage system 21.

The register 43 accepts supply of this command and temporarily holds the command. The controller 41 in the storage system 21 acquires the command held in the register 43, and interprets a content of the command. Because the storage system 21 and the host system 22 perform data transfer using the link list transfer mode as described above, the controller 41 configures the DMA controller 44 in accordance with the link list transfer mode.

In the case where the host system 22 reads the data from the storage system 21, the controller 41 controls the storage memory controller 47 to allow the data that is to be read to be transferred from the storage memory 48 to the buffer memory 45. When a content of the data stored in the buffer memory 45 becomes effective, the DMA controller 44 transfers the data stored in the buffer memory 45 to the host memory 62 via the storage I/F bus 46 and the storage I/F 23.

Here, a command set related to data transfer that is possessed by the host system 22, in which the physical address space in the host memory 62 is, unlike the logical address space, composed of a plurality of discontinuous (discrete) areas as described above with reference to FIG. 1, will be described below. The command set related to data transfer that is possessed by the host system 22 includes a READ_DATA_LINKLIST command and a WRITE_DATA_LINKLIST command.

The READ_DATA_LINKLIST command is a command for initiating continuous reading of data having a specified size and starting with a specified address in the link list transfer mode. The WRITE_DATA_LINKLIST command is a command for initiating continuous writing of data having a specified size and starting with a specified address in the link list transfer mode.

In the link list transfer mode, a link list composed of a plurality of descriptors in a format as shown in FIG. 4 is used for writing data to the discrete physical address space or reading data from the discrete physical address space. The individual descriptors constituting the link list are referred to also as "entries".

Each entry includes at least a transfer address, a transfer size, and transfer control information (EOT) that indicates whether the corresponding entry is the last entry in the link list. In the link list transfer mode, which is a transfer mode that involves the use of the link list, the host system 22 sets a top address of the link list in the host memory 62 in the register 43 in the storage system 21. In accordance with this setting, the DMA controller 44 reads the first entry from the host memory 62.

Based on such transfer information described in this entry, the DMA controller 44 is capable of performing necessary transfer. After the transfer using the first entry is complete, the DMA controller 44 acquires the next entry from the link list, and performs transfer in a similar manner. The DMA controller 44 refers to an EOT flag of the transfer control information in the entry to determine whether this entry is the last entry. The DMA controller 44 repeats the above operation until the last entry.

[On Restrictions]

It is assumed here that a packet-based bus interface is used for the storage I/F 23, and that the PCI Express is used as the packet-based bus interface. In the case where the PCI Express is adopted as the storage I/F 23, the following restrictions need to be taken account of when performing data exchange.

In related art, the host system 22 generates the link list so as to observe the following restrictions, and the storage 21 system performs processing based on the link list. In the present embodiment, however, the storage system 21 is capable of performing processing while observing the following restrictions, without the need for the host system 22 to generate the link list so as to observe the restrictions. First, the restrictions will now be described below.

Restriction 1 is that a transfer ability of the host system 22 to which the storage system 21 is connected, e.g., Max Payload Size that represents a maximum size of a payload at the time of writing and Max Read Request Size that represents a maximum size at the time of reading, must be taken account of so that data exchange is performed without such sizes being exceeded. In the case where there is a desire to transfer data that exceeds such a size, for example, the host system 22 in related art, which generates the link list while taking account of the restrictions, needs to generate the link list such that the data will be divided into parts for data exchange.

Further, writing or reading to or from the buffer memory 45 in the storage system 21 is restricted depending on whether the buffer memory 45 is accessible (Full/Empty). As such, restriction 2 is that data exchange must be performed such that the size (hereinafter referred to as a "buffer size" as appropriate) of the buffer memory 45 is not exceeded. Similar to the case of restriction 1, in the case where there is a desire to transfer a large amount of data that exceeds the buffer size, for example, the host system 22 in related art, which generates the link list while taking account of the restrictions, needs to generate the link list such that the data is divided into parts in accordance with the buffer size for data exchange.

Restrictions 1 and 2 will now be described below in more detail with reference to FIG. 5. An upper table in FIG. 5 shows relationships between Max Read Request Size and a maximum transfer size. A lower table in FIG. 5 shows relationships between Max Payload Size and the maximum transfer size. Max Payload Size refers to a maximum size of data that can be added to a packet. Max Read Request Size refers to a maximum size of data that can be requested.

For example, suppose that, as a result of exchange of communication abilities between the storage system 21 and the host system 22, Max Payload Size is determined to be 128 bytes and Max Read Request Size is set at 2048 bytes by the host system 22 for the storage system 21. In this case, when transferring data from the host system 22 to the storage system 21, the DMA controller 44 in the storage system 21 issues a read request to the host system 22, and at this time a maximum of 2048 bytes can be requested.

If the host system 22 receives a read request for data of 2048 bytes, the host system 22 divides the data into sixteen parts each of which is 128 bytes in size and sends them separately to the storage system 21, as Max Payload Size is 128 bytes. In the case where the PCI Express is applied to the storage I/F 23, for example, data transfer is performed in such a manner because, in the specifications of the PCI Express, dividing the data and separately sending the divided parts are permitted for the read request.

Max Payload Size is applied not only at the time of writing but also at the time of reading. Since the DMA controller 44 is provided in the storage system 21, the read request is issued from the DMA controller 44 in the storage system 21 to the host system 22 when the data is written to the storage system 21. Note that "reading" and "writing" are defined conversely for the side issuing the request and the size receiving the request.

When data transfer is performed between the storage system 21 and the host system 22, restrictions 1 and 2 as described above are imposed in accordance with the transfer ability such as Max Read Request Size and Max Payload Size or the buffer size in the storage system 21.

Next, restriction 3 will now be described below. According to restriction 3, generation of a packet that leads to access across a predetermined address boundary is prohibited owing to regulations of the bus. In the specifications of the PCI Express, for example, generation of a packet that leads to access across a 4K address boundary (a page boundary in a personal computer) is prohibited. Therefore, it is necessary to avoid transfer that involves access across the 4K address boundary.

In the case where a packet generated from a predetermined address in accordance with the above buffer size extends across the 4K page boundary, for example, the host system 22 in related art needs to divide the packet into parts, which are to be transferred separately, before transferring the packet. In related art, a method of dividing the link list is adopted to do such division, for example. Alternatively, in related art, it is necessary to place a restriction so that addresses of the packet will not extend across the 4K boundary, in accordance with the transfer size determined by the buffer size.

Restriction 3 will now be described below in more detail with reference to FIG. 6. Suppose the case where 8K-byte data is to be read from the host memory 62 and the address boundaries are set on a 4K byte basis. In the following description made with reference to FIG. 6, restrictions 1 and 2 are not taken account of.

Figure 6:
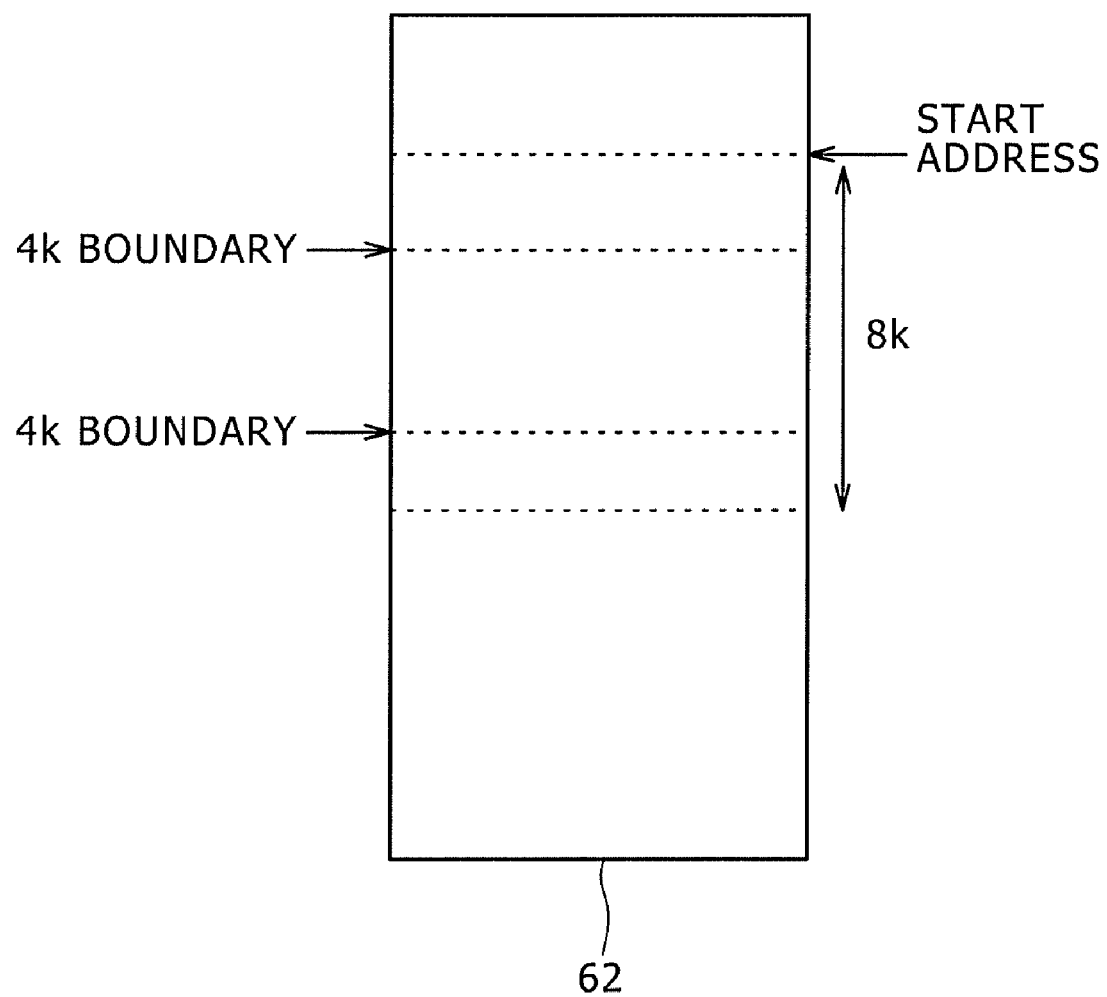
FIG. 6 is a diagram for describing a 4K address boundary.

Suppose that, as shown in FIG. 6, 8K-byte data whose top address is denoted as a start address is to be read. This 8K-byte data extends across two 4K boundaries. Accordingly, link lists are generated so that a part of the 8K-byte data that precedes the first 4K boundary will be transferred first, a part of the 8K-byte data that extends between the first 4K boundary and the next 4K boundary will be transferred next, and the remaining part of the 8K-byte data that follows the second 4K boundary will be transferred last. As described above, in this case, three link lists are generated while restriction 3 is taken account of, so that no data transfer will involve access across the address boundary.

Next, restriction 4 will now be described below. According to restriction 4, when there is a desire to transfer data whose size is smaller than the buffer size, it is necessary to do padding, i.e., add redundant data to the data to be transferred in accordance with the buffer size. In the case where the buffer size is 2K bytes and only four bytes of data is to be sent, for example, (2K−4) bytes of redundant data needs to be added to the four bytes of data to be sent so that the data to be sent will have a size of 4K bytes. In contrast to the four bytes of data, which is significant, the (2K−4) bytes of redundant data has no essential meaning. Sending of such essentially meaningless data leads to useless occupation of a communication channel. Thus, for efficient transfer, consideration needs to be taken to minimize padding and perform transfer in accordance with the buffer size in related art.

In related art, the host system 22 to which the storage system 21 is connected needs to take account of all of restrictions 1 to 4 when constructing the link list. Constructing the link list taking account of all of the above restrictions means an increase in processing of the host system 22. In this case, even when DMA data transfer is performed in order to reduce the processing of the host system 22, the maximum effect thereof cannot be achieved.

In the present embodiment, data transfer can be performed appropriately without the need for the host system 22 to take account of the above restrictions, so that the processing in the host system 22 is reduced. In other words, the host system 22 issues instructions without taking account of the above restrictions 1 to 4, while the storage system 21 performs processing while observing restrictions 1 to 4.

Since the host system 22 is allowed to issue instructions related to data transfer without taking account of the above restrictions, the processing in the host system 22 is naturally reduced, and additionally, the host system 22 is able to issue instructions flexibly, i.e., the flexibility on the part of the host system 22 is increased.

Data transfer in which the above restrictions 1 to 4 are taken account of on the part of the storage system 21 will now be described below. FIG. 7 shows an exemplary structure of circuitry for achieving data transfer in which restrictions 1 to 4 are taken account of on the part of the storage system 21. The circuitry as shown in FIG. 7 is contained in the DMA controller 44 in the storage system 21, for example.

The circuitry as shown in FIG. 7 includes a maximum transfer size determination circuit 101, a 4K boundary determination circuit 102, a buffer boundary determination circuit 103, a transfer size determination circuit 104, a priority determination circuit 105, a DMA 106, a subtractor 107, an adder 108, an adder 109, a remaining size register 110, an accumulation size register 111, and a next address register 112.

Max Payload Size and Max Read Request Size are supplied from the register 43 (FIG. 2) to the maximum transfer size determination circuit 101. In addition, an instruction for reading or an instruction for writing is supplied from the host system 22 to the maximum transfer size determination circuit 101. Based on the instruction for reading or the instruction for writing, the maximum transfer size determination circuit 101 sets the maximum transfer size in accordance with Max Payload Size and Max Read Request Size.

The maximum transfer size determination circuit 101 is a circuit for performing the setting so as to meet restriction 1. An output from the maximum transfer size determination circuit 101, i.e., information concerning a maximum transferable size, is supplied to the 4K boundary determination circuit 102 and the transfer size determination circuit 104.

The 4K boundary determination circuit 102 is a circuit for performing the setting so as to meet restriction 3. Information concerning Request Size is supplied from the remaining size register 110 to the 4K boundary determination circuit 102. In addition, information concerning Request Address is supplied from the next address register 112 to the 4K boundary determination circuit 102. Request Size refers to the size of data to be transferred, whereas Request Address refers to a read start address of the data to be transferred.

The 4K boundary determination circuit 102 determines whether the data to be transferred, i.e., (Request Address)+ (Request Size), extends across the 4K address boundary. Request Size is supplied from the remaining size register 110 as described above. Request Size supplied from the remaining size register 110 represents a size obtained by subtracting the amount of data that has already been transferred from Request Size (a total amount of the data that should be read or written), notification of which has been supplied from the host system 22. That is, the remaining size register 110 stores a total amount of data that remains to be transferred at the time. The size stored in the remaining size register 110 is an output from the subtractor 107.

Request Size is inputted from the host system 22 to the remaining size register 110. The remaining size register 110 holds, as an initial value, Request Size inputted from the host system 22. As data transfer is performed repeatedly thereafter, the total amount of data that remains to be transferred at the time decreases gradually. An output from the priority determination circuit 105 and information concerning the data amount held in the remaining size register 110 are supplied to the subtractor 107. The output from the priority determination circuit 105 is the amount of data that will be transferred at the time, as described below.

In other words, the amount of the data that will be transferred at the time and the total amount of the data that remains to be transferred at the time are supplied to the subtractor 107. The subtractor 107 subtracts the amount of the data that will be transferred from the total amount of the data that remains to be transferred at the time, thereby calculating the total amount of data that remains to be transferred at a next point in time, i.e., the amount of the remaining data that will not have been transferred yet at the next point in time. Then, the data amount thus calculated is held in the remaining size register 110.

If a result of the above determination is "True", the 4K boundary determination circuit 102 outputs, to the priority determination circuit 105, information "True" and a difference between the top address of the data that remains to be transferred and a next 4K address boundary as determination A and requested transfer size A, respectively. Meanwhile, if the result of the above determination is "False", the 4K boundary determination circuit 102 outputs, to the priority determination circuit 105, information "False" and Request Size supplied from the remaining size register 110 as determination A and requested transfer size A, respectively.

That is, the 4K boundary determination circuit 102 outputs, to the priority determination circuit 105, the maximum data transfer amount that does not lead to the data to be transferred extending across the 4K boundary. Note that the value of 4K is assumed in the present embodiment because the boundaries are set on a 4K byte basis. In the case where the boundaries are set based on another value, the 4K boundary determination circuit 102 outputs determination A and requested transfer size A for preventing the data to be transferred from extending across any boundary that is based on the other value.

The buffer boundary determination circuit 103 is a circuit for determining whether a data transfer request as specified by Request Size and Request Address leads to the buffer size of the buffer memory 45 being exceeded. The buffer boundary determination circuit 103 is a circuit for performing the setting so as to meet restriction 2, and is a determination circuit for dividing the packet in accordance with the buffer size. The buffer boundary determination circuit 103 outputs, to the priority determination circuit 105, a determination of whether the buffer size is exceeded as determination B. In addition, the buffer boundary determination circuit 103 outputs, to the priority determination circuit 105, a transfer size at the time as requested transfer size B.

It is assumed here that information "True" is outputted as determination B when it has been determined that the buffer size is exceeded, and that information "False" is outputted as determination B when it has been determined that the buffer size is not exceeded.

The determination made by the buffer boundary determination circuit 103 will now be described below with reference to an exemplary case where the buffer size is 2048 bytes (2K bytes). Suppose that data "8 bytes" is held in the accumulation size register 111 as a result of the previous instance of data transfer, for example. As the accumulation size register 111 holds the amount of data that remains in the buffer memory 45 to be transferred, information "8 bytes" is held therein in this case.

When information "8 bytes" is held in the accumulation size register 111, 8 bytes of data is stored in the buffer memory 45. If a data transfer request for 2048 bytes is made in this situation, the 2048 bytes is divided into 2040 bytes and 8 bytes. Addition of the 2040 bytes to the accumulation size, 8 bytes, gives 2048 bytes, which corresponds to the buffer size. The buffer boundary determination circuit 103 outputs 2048 bytes to the priority determination circuit 105 as requested transfer size B.

Since the original transfer request is for 2048 bytes, the remaining 8 bytes is held in the accumulation size register 111 and will be outputted as a part of requested transfer size B at the next transfer request. That is, 2048 bytes, transfer of which has been requested, is divided into two pieces of data "2040 bytes" and "8 bytes". At this time, in order to write 8 bytes of data corresponding to the latter piece of data "8 bytes", the next transfer address should be (Request Address)+2040.

Accordingly, the above value to be added needs to be held in the next address register 112. The accumulation size register 111 is cleared when the buffer size of 2048 bytes is reached, and when 2040 bytes has been transferred, 0 (zero) bytes is held therein, and when the remaining 8 bytes has been transferred, 8 bytes is held therein. The remaining transfer size can be calculated by the following expression: buffer size (2048 bytes)−(accumulation size). In the present embodiment, however, the remaining size register 110 is provided, and a calculated value is held in the remaining size register 110. Note that the provision of the remaining size register 110 is not essential to the present invention, and that the remaining size register 110 may not be provided in another embodiment of the present invention.

The transfer size determination circuit 104 is a circuit for performing the setting so as to meet restriction 4. The information concerning the maximum transferable size is supplied from the maximum transfer size determination circuit 101 to the transfer size determination circuit 104. In addition, the information concerning Request Size is supplied from the remaining size register 110 to the transfer size determination circuit 104. The transfer size determination circuit 104 determines whether or not the requested transfer size (Request Size) is equal to or less than the maximum transferable size, and outputs, to the priority determination circuit 105, a result of this determination as determination C. It is assumed here that information "True" is outputted as determination C when it has been determined that the requested transfer size is equal to or less than the maximum transferable size, and that information "False" is outputted as determination C when it has been determined that the requested transfer size is not equal to or less than the maximum transferable size.

When a determination made by the transfer size determination circuit 104 is positive, i.e., when the transfer size determination circuit 104 has determined that the transfer size is equal to or less than the maximum transfer size, the transfer size determination circuit 104 outputs the transfer size, which is equal to or less than the maximum transfer size, to the priority determination circuit 105 as requested transfer size C.

Determinations A, B, and C are supplied from the 4K boundary determination circuit 102, the buffer boundary determination circuit 103, and the transfer size determination circuit 104, respectively, to the priority determination circuit 105. Thus, the three determinations are supplied to the priority determination circuit 105. If two or more of the three determinations are "True", in other words, if it is determined that two or more of the conditions are satisfied, the priority determination circuit 105 outputs, to the DMA 106, the smallest value as a final requested transfer size. Specifically, requested transfer sizes A, B, and C are supplied to the priority determination circuit 105 from the 4K boundary determination circuit 102, the buffer boundary determination circuit 103, and the transfer size determination circuit 104, respectively. One of the three requested transfer sizes A, B, and C that has the smallest value of the three is outputted to the DMA 106 as the final requested transfer size.

The operation of the circuitry as shown in FIG. 7 will now be described below with reference to FIGS. 8 to 12 using specific numerical values. In FIGS. 8 to 12, a portion of the circuitry as shown in FIG. 7 which is necessary for explanation is shown.

Figure 8:
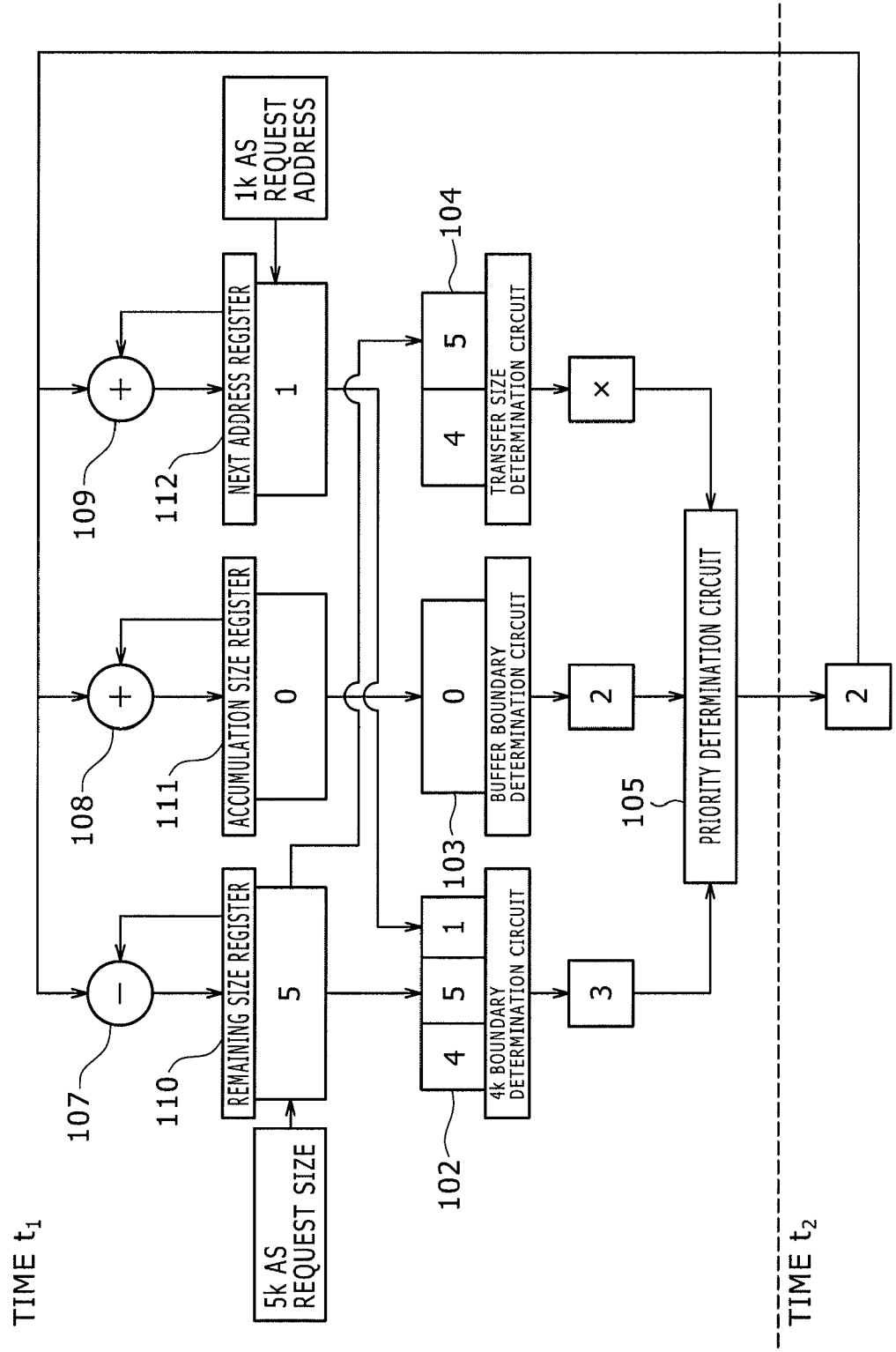
FIGS. 8 to 12 are diagrams for describing an operation of the DMA controller.

FIG. 8 shows a situation at time t1, when an instruction for data transfer has been issued. It is assumed that, when the instruction for data transfer has been issued, 5K bytes and 1K have been specified as Request Size and Request Address, respectively. In addition, it is assumed that the maximum transfer size is 4K.

Since Request Size is supplied to the remaining size register 110, the information concerning the remaining size held in the remaining size register 110 at time t1 is 5K. Since Request Address is supplied to the next address register 112, the information concerning the read start address held in the next address register 112 at time t1 is 1K. Numbers enclosed within squares or rectangles in FIG. 8 represent values stored in the registers, values supplied to the determination circuits, values to be outputted, or the like.

Data transfer has not been performed yet at time t1. Therefore, the accumulation size register 111 stores "0" as the amount of the data remaining in the buffer memory 45 (FIG. 2). It is assumed here that the maximum amount of data that can be stored in the buffer memory 45 is 2K.

At time t1, the maximum transfer size determination circuit 101 (FIG. 7) supplies information "4K" to the 4K boundary determination circuit 102, the remaining size register 110 supplies information "5K" to the 4K boundary determination circuit 102, and the next address register 112 supplies information "1K" to the 4K boundary determination circuit 102. In this case, 5K bytes of data is to be read, starting with a read start address of 1K. That is, data that exists between address 1K and address 6K (=1K+5K) is the data to be transferred.

Since 4K is the boundary in this case, the data existing between 1K and 6K extends across the 4K boundary. Therefore, information "True" is outputted as determination A. In addition, the maximum size that does not cause the data to be transferred to extend across the 4K boundary is outputted as requested transfer size A. Specifically, in this case, if data that exists between address 1K and address 4K is read, data transfer can be performed with the maximum size and without the 4K boundary being extended across. Therefore, the size 3K of the data that exists between 1K and 4K is supplied to the priority determination circuit 105 as requested transfer size A.

The information held in the accumulation size register 111 is supplied to the buffer boundary determination circuit 103 at time t1. Therefore, at time t1, information "0K" is supplied to the buffer boundary determination circuit 103. The buffer boundary determination circuit 103 determines whether the data transfer request as specified by Request Size and Request Address leads to the buffer size of the buffer memory 45 being exceeded. Since Request Size is 5K and Request Address is 1K in this case, the buffer boundary determination circuit 103 determines that the buffer size is exceeded, and outputs information "True" as determination B. In addition, since 2K bytes of data can be stored in the buffer memory 45 in this case, information "2K" is outputted as requested transfer size B.

At time t1, information "4K" is supplied from the maximum transfer size determination circuit 101 (FIG. 7) to the transfer size determination circuit 104, and information "5K" is supplied from the remaining size register 110 to the transfer size determination circuit 104. The transfer size determination circuit 104 determines whether or not the transfer size is equal to or less than the maximum transfer size. Since the transfer size is 5K and the maximum transfer size is 4K in this case, the transfer size determination circuit 104 outputs information "False" as determination C. In the case where information "False" is outputted, information as requested transfer size C is not outputted (i.e., data representing a specific number is not outputted).

As described above, at time t1, information "True", information "True", and information "False" are supplied to the priority determination circuit 105 as determinations A, B, and C, respectively. Since two or more pieces of information "True" have been supplied to the priority determination circuit 105, the priority determination circuit 105 outputs the smallest value of the supplied requested transfer sizes as the final requested transfer size. In this case, "3K" and "2K" have been supplied to the priority determination circuit 105 as requested transfer sizes A and B, respectively, and therefore, 2K is set as the requested transfer size.

At time t2, 2K is set as the requested transfer size, and this information is supplied to the DMA 106. The DMA 106 exercises control for performing data transfer with the transfer size of 2K.

At time t2, information "2K" is supplied from the priority determination circuit 105 to each of the subtractor 107, the adder 108, and the adder 109.

Figure 9:
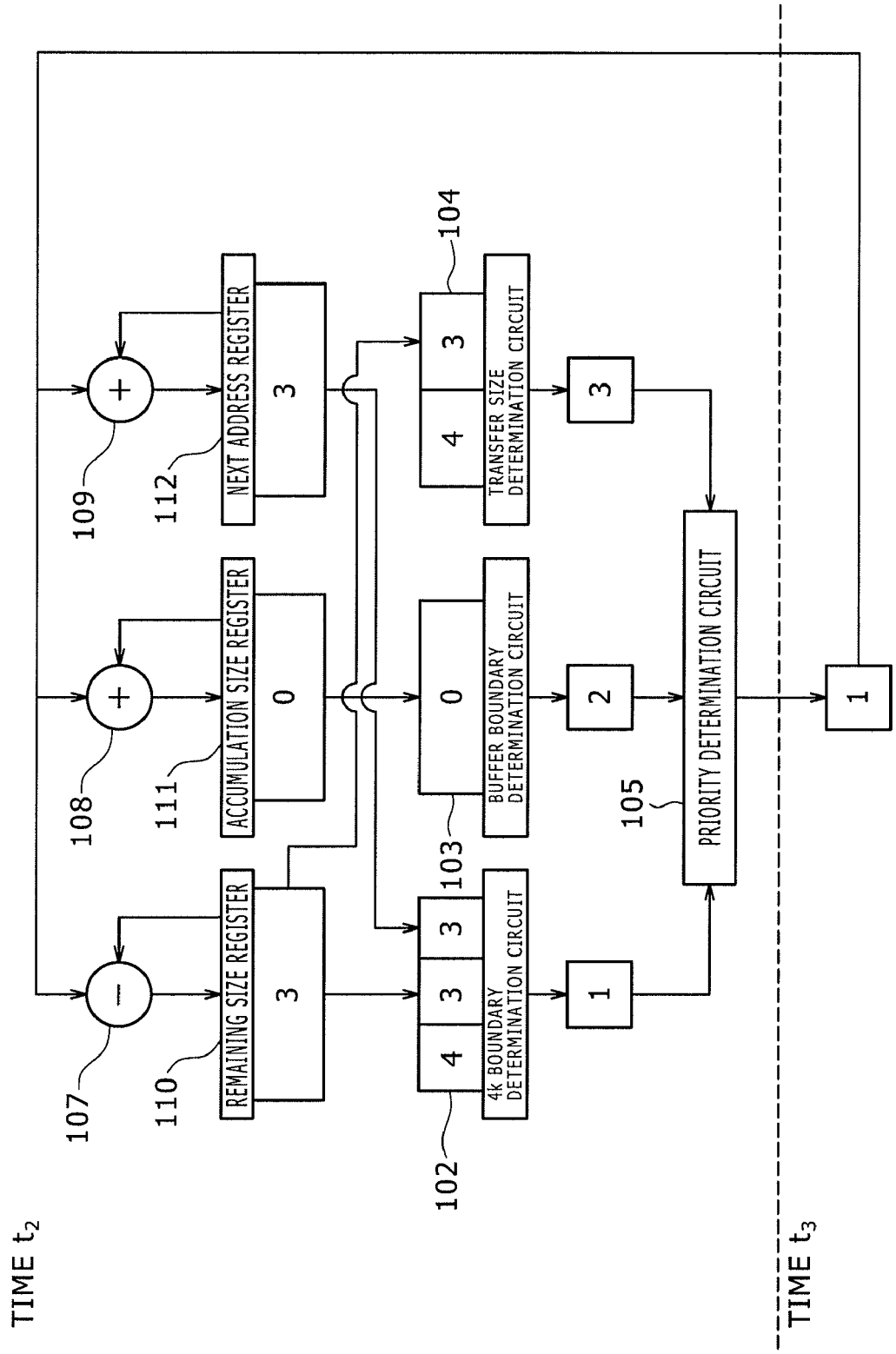

Referring to FIGS. 8 and 9, the information held in the remaining size register 110 at time t1, which is previous to time t2, and the information from the priority determination circuit 105 are supplied to the subtractor 107. In this case, information "5K" and information "2K" are supplied from the remaining size register 110 and the priority determination circuit 105, respectively, to the subtractor 107. The subtractor 107 calculates a difference between 5K and 2K, and supplies a result of this calculation to the remaining size register 110. Note that a value outputted from the subtractor 107 is an absolute value.

At time t2, the result supplied from the subtractor 107 is held in the remaining size register 110. Therefore, information held in the remaining size register 110 in this case is information "3K".

The information held in the accumulation size register 111 at time t1, which is previous to time t2, and the information from the priority determination circuit 105 are supplied to the adder 108. In this case, information "0K" and information "2K" are supplied from the accumulation size register 111 and the priority determination circuit 105, respectively, to the adder 108. The adder 108 calculates the sum of 0K and 2K, and supplies a result of this calculation to the accumulation size register 111.

At time t2, the result supplied from the adder 108 is held in the accumulation size register 111. Thus, the information held in the accumulation size register 111 in this case is information "2K", but since the accumulation size register 111 clears the information, thereby resetting it to 0K, each time the information reaches 2K, information "0K" is held in the accumulation size register 111 in this case.

The information held in the next address register 112 at time t1, which is previous to time t2, and the information from the priority determination circuit 105 are supplied to the adder 109. In this case, information "1K" and information "2K" are supplied from the next address register 112 and the priority determination circuit 105, respectively, to the adder 109. The adder 109 calculates the sum of 1K and 2K, and supplies a result of this calculation to the next address register 112.

At time t2, the result supplied from the adder 109 is held in the next address register 112. Therefore, the information held in the next address register 112 in this case is information "3K".

The information is held in each register in the above-described manners.

Information "4K", information "3K", and information "3K" are supplied to the 4K boundary determination circuit 102 as the maximum transfer size, the remaining transfer size, and the read start address, respectively. Therefore, in this case, data of 3K bytes (corresponding to the remaining transfer size) is to be read, starting with a read start address of 3K. In other words, data that exists between address 3K and address 6K (=3K+3K) is the data to be transferred.

Since 4K is the boundary in this case, the data existing between 3K and 6K extends across the 4K boundary. Therefore, information "True" is outputted as determination A. In addition, the maximum size that does not cause the data to be transferred to extend across the 4K boundary is outputted as requested transfer size A. Specifically, in this case, if data that exists between address 3K and address 4K is read, data transfer can be performed with the maximum size and without the 4K boundary being extended across. Therefore, the size 1K of the data that exists between 3K and 4K is supplied to the priority determination circuit 105 as requested transfer size A.

At time t2, information "0K" is supplied from the accumulation size register 111 to the buffer boundary determination circuit 103. In this case, the buffer boundary determination circuit 103 determines that the buffer size is exceeded, and outputs information "True" as determination B. In addition, since 2K bytes of data can be stored in the buffer memory 45 in this case, information "2K" is outputted as requested transfer size B.

At time t2, information "4K" and information "3K" are supplied from the maximum transfer size determination circuit 101 (FIG. 7) and the remaining size register 110, respectively, to the transfer size determination circuit 104. The transfer size determination circuit 104 determines whether or not the transfer size is equal to or less than the maximum transfer size. Since the transfer size is 3K and the maximum transfer size is 4K in this case, the transfer size determination circuit 104 outputs information "True" as determination C. In the case where information "True" is outputted, the value of the transfer size supplied is set as requested transfer size C and outputted as such. Therefore, in this case, information "3K" is outputted as requested transfer size C.

As described above, at time t2, information "True", information "True", and information "True" are supplied to the priority determination circuit 105 as determinations A, B, and C, respectively. Thus, since two or more pieces of information "True" have been supplied to the priority determination circuit 105, the priority determination circuit 105 outputs the smallest value of the supplied requested transfer sizes as the final requested transfer size. In this case, "1K", "2K", and "3K" have been supplied to the priority determination circuit 105 as requested transfer sizes A, B, and C, respectively, and therefore, 1K is set as the requested transfer size.

At time t3, 1K is set as the requested transfer size, and this information is supplied to the DMA 106. The DMA 106 exercises control for performing data transfer with the transfer size of 1K.

At time t3, information "1K" is supplied from the priority determination circuit 105 to each of the subtractor 107, the adder 108, and the adder 109.

Figure 10:
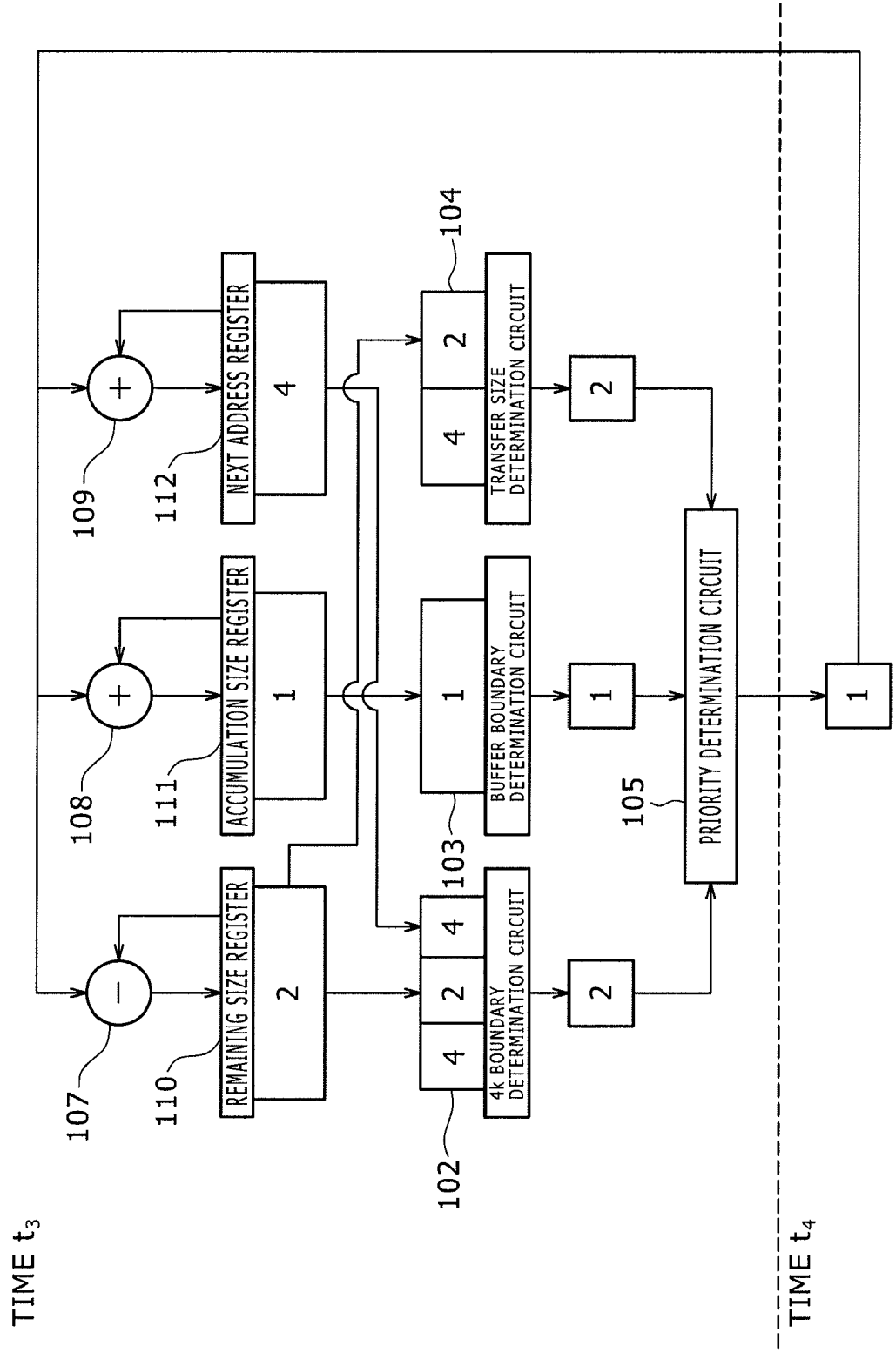

Referring to FIGS. 9 and 10, at time t3, information "3K" held in the remaining size register 110 at time t2 and information "1K" from the priority determination circuit 105 are supplied to the subtractor 107. The subtractor 107 calculates a difference between 3K and 1K, and supplies a result of this calculation, i.e., information "2K", to the remaining size register 110. Thus, information "2K" is held in the remaining size register 110 in this case.

At time t3, information "0K" held in the accumulation size register 111 at time t2 and information "1K" from the priority determination circuit 105 are supplied to the adder 108. The adder 108 calculates the sum of 0K and 1K, and supplies a result of this calculation, i.e., information "1K", to the accumulation size register 111. Thus, information "1K" is held in the accumulation size register 111 in this case.

At time t3, information "3K" held in the next address register 112 at time t2 and information "1K" from the priority determination circuit 105 are supplied to the adder 109. The adder 109 calculates the sum of 3K and 1K, and supplies a result of this calculation, i.e., information "4K", to the next address register 112. Thus, information "4K" is held in the next address register 112 in this case.

The information is held in each register in the above-described manners.

Information "4K", information "2K", and information "4K" are supplied to the 4K boundary determination circuit 102 as the maximum transfer size, the remaining transfer size, and the read start address, respectively. Therefore, in this case, data of 2K bytes (corresponding to the remaining transfer size) is to be read, starting with a read start address of 4K. In other words, data that exists between address 4K and address 6K (=4K+2K) is the data to be transferred.

Since 4K is the boundary in this case, the data existing between 4K and 6K does not extend across the 4K boundary. Therefore, information "False" is outputted as determination A. In addition, since the data does not extend across the 4K boundary, the remaining requested transfer size is outputted as requested transfer size A. Therefore, in this case, the size 2K of the data that exists between address 4K and address 6K is supplied to the priority determination circuit 105 as requested transfer size A.

At time t3, information "1K" is supplied from the accumulation size register 111 to the buffer boundary determination circuit 103. In this case, the buffer boundary determination circuit 103 determines that the buffer size is exceeded, and outputs information "True" as determination B. In addition, since 1K bytes of data can be stored in the buffer memory 45 in this case, information "1K" is outputted as requested transfer size B.

At time t3, information "4K" and information "2K" are supplied from the maximum transfer size determination circuit 101 (FIG. 7) and the remaining size register 110, respectively, to the transfer size determination circuit 104. The transfer size determination circuit 104 determines whether or not the transfer size is equal to or less than the maximum transfer size. Since the transfer size is 2K and the maximum transfer size is 4K in this case, the transfer size determination circuit 104 outputs information "True" as determination C. In the case where information "True" is outputted, the value of the transfer size supplied, i.e., information "2K" in this case, is outputted as requested transfer size C.

As described above, at time t3, information "False", information "True", and information "True" are supplied to the priority determination circuit 105 as determinations A, B, and C, respectively. Thus, since two or more pieces of information "True" have been supplied to the priority determination circuit 105, the priority determination circuit 105 outputs the smallest value of the supplied requested transfer sizes as the final requested transfer size. In this case, "2K", "1K", and "2K" have been supplied to the priority determination circuit 105 as requested transfer sizes A, B, and C, respectively, and therefore, 1K is set as the requested transfer size.

At time t4, 1K is set as the requested transfer size, and this information is supplied to the DMA 106. The DMA 106 exercises control for performing data transfer with the transfer size of 1K.

At time t4, information "1K" is supplied from the priority determination circuit 105 to each of the subtractor 107, the adder 108, and the adder 109.

Figure 11:
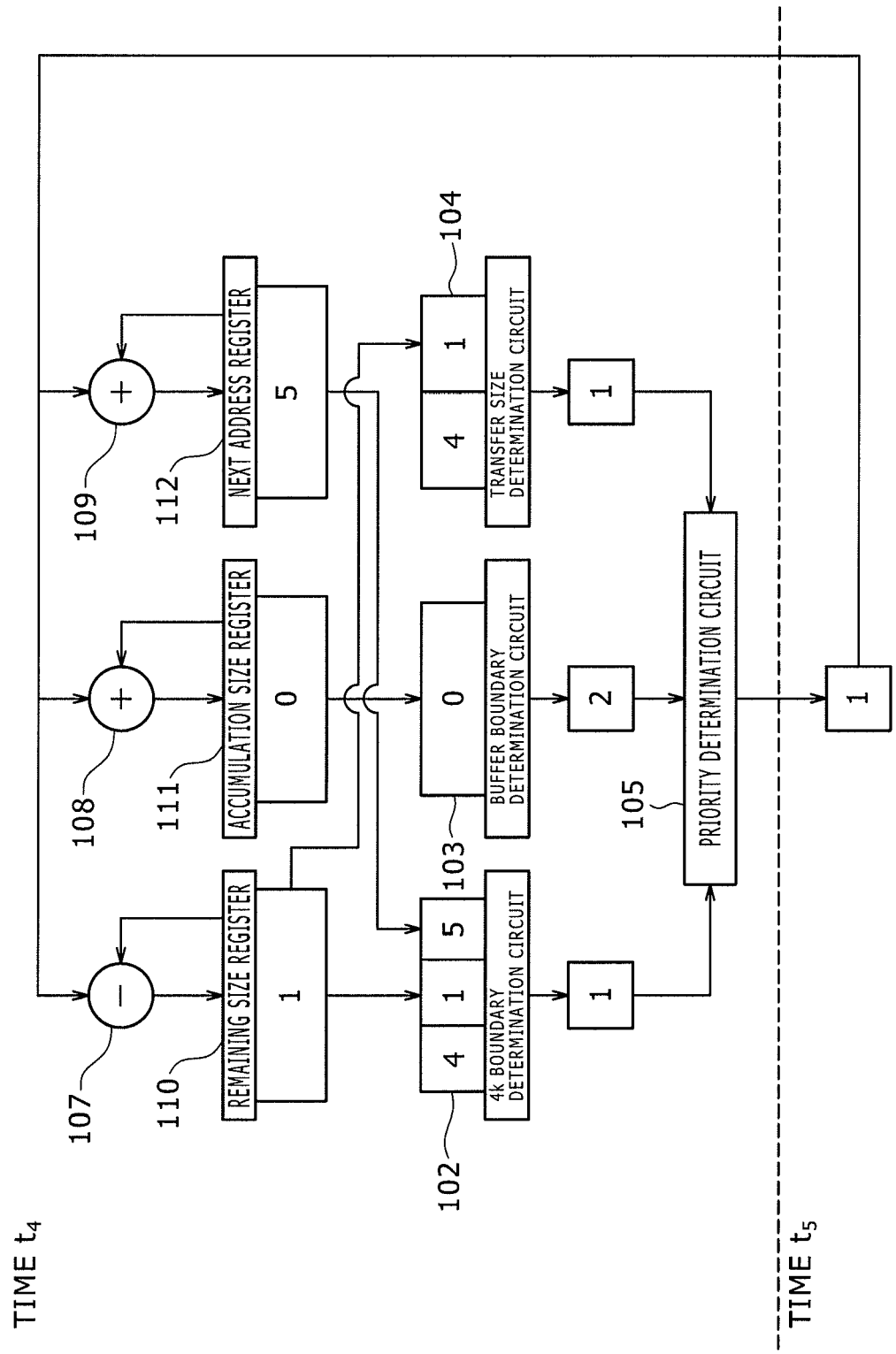

Referring to FIGS. 10 and 11, at time t4, information "2K" held in the remaining size register 110 at time t3 and information "1K" from the priority determination circuit 105 are supplied to the subtractor 107. The subtractor 107 calculates a difference between 2K and 1K, and supplies a result of this calculation, i.e., information "1K", to the remaining size register 110. Thus, information "1K" is held in the remaining size register 110 in this case.

At time t4, information "1K" held in the accumulation size register 111 at time t3 and information "1K" from the priority determination circuit 105 are supplied to the adder 108. The adder 108 calculates the sum of 1K and 1K, and supplies a result of this calculation, i.e., information "2K", to the accumulation size register 111. Thus, the information held in the accumulation size register 111 in this case is "2K", but since the information in the accumulation size register 111 is reset to "0K" when information "2K" is held therein, information "0K" is held in the accumulation size register 111.

At time t4, information "4K" held in the next address register 112 at time t3 and information "1K" from the priority determination circuit 105 are supplied to the adder 109. The adder 109 calculates the sum of 4K and 1K, and supplies a result of this calculation, i.e., information "5K", to the next address register 112. Thus, information "15K" is held in the next address register 112 in this case.

The information is held in each register in the above-described manners.

Information "4K", information "1K", and information "5K" are supplied to the 4K boundary determination circuit 102 as the maximum transfer size, the remaining transfer size, and the read start address, respectively. Therefore, in this case, data of 1K bytes (corresponding to the remaining transfer size) is to be read, starting with a read start address of 5K. In other words, data that exists between address 5K and address 6K (=5K+1K) is the data to be transferred.

Since 4K is the boundary in this case, the data existing between 5K and 6K does not extend across the 4K boundary. Therefore, information "False" is outputted as determination A. In addition, since the data does not extend across the 4K boundary, the remaining requested transfer size is outputted as requested transfer size A. Therefore, in this case, the size 1K of the data that exists between address 5K and address 6K is supplied to the priority determination circuit 105 as requested transfer size A.

At time t4, information "0K" is supplied from the accumulation size register 111 to the buffer boundary determination circuit 103. In this case, the buffer boundary determination circuit 103 determines that the buffer size is not exceeded, and outputs information "False" as determination B. In addition, since 2K bytes of data can be stored in the buffer memory 45 in this case, information "2K" is outputted as requested transfer size B.

At time t4, information "4K" is supplied from the maximum transfer size determination circuit 101 (FIG. 7) to the transfer size determination circuit 104, and information "1K" is supplied from the remaining size register 110 to the transfer size determination circuit 104. The transfer size determination circuit 104 determines whether or not the transfer size is equal to or less than the maximum transfer size. Since the transfer size is 1K and the maximum transfer size is 4K in this case, the transfer size determination circuit 104 outputs information "True" as determination C. In the case where information "True" is outputted, the value of the transfer size supplied, i.e., information "1K" in this case, is outputted as requested transfer size C.

As described above, at time t4, information "False", information "False", and information "True" are supplied to the priority determination circuit 105 as determinations A, B, and C, respectively. Thus, since two or more pieces of information "True" have not been supplied to the priority determination circuit 105, the priority determination circuit 105 outputs, out of the requested transfer sizes supplied, requested transfer size C supplied from the transfer size determination circuit 104 as the final requested transfer size. Therefore, 1K is set as the requested transfer size in this case.

At time t5, 1K is set as the requested transfer size, and this information is supplied to the DMA 106. The DMA 106 exercises control for performing data transfer with the transfer size of 1K.

At time t5, information "1K" is supplied from the priority determination circuit 105 to each of the subtractor 107, the adder 108, and the adder 109.

Figure 12:
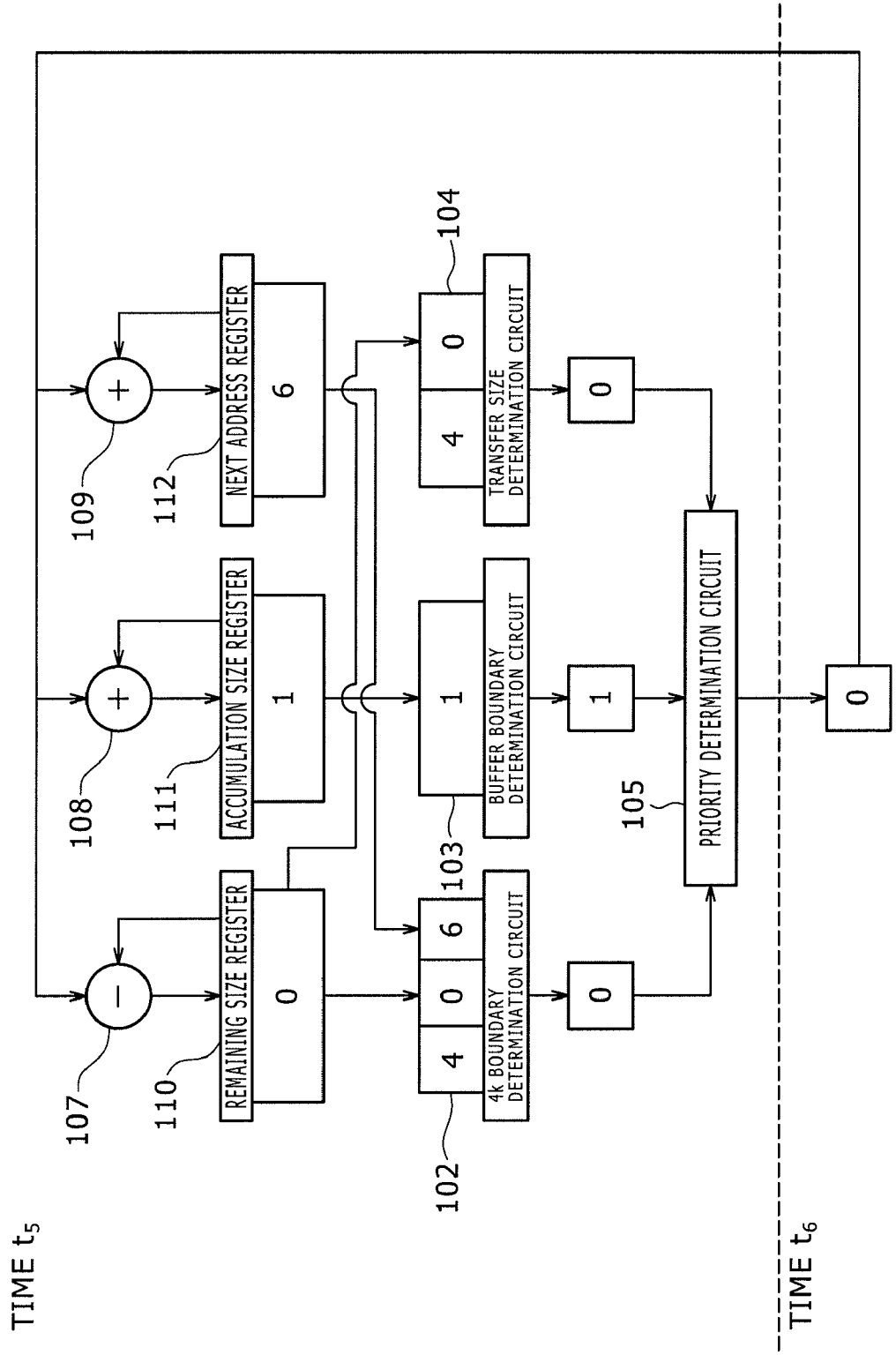

Referring to FIGS. 11 and 12, at time t5, information "1K" held in the remaining size register 110 at time t4 and information "1K" from the priority determination circuit 105 are supplied to the subtractor 107. The subtractor 107 calculates a difference between 1K and 1K, and supplies a result of this calculation, i.e., information "0K", to the remaining size register 110. Thus, information "0K" is held in the remaining size register 110 in this case.

The fact that the information held in the remaining size register 110 is "0K" means that there is no data that remains to be transferred. Thus, this procedure may be terminated when the information held in the remaining size register 110 has become "0K". However, it is assume here for the sake of explanation that the procedure proceeds without being terminated at this point.

At time t5, information "0K" held in the accumulation size register 111 at time t4 and information "1K" from the priority determination circuit 105 are supplied to the adder 108. The adder 108 calculates the sum of 0K and 1K, and supplies a result of this calculation, i.e., information "1K", to the accumulation size register 111. Thus, information "1K" is held in the accumulation size register 111 in this case.

At time t5, information "5K" held in the next address register 112 at time t4 and information "1K" from the priority determination circuit 105 are supplied to the adder 109. The adder 109 calculates the sum of 5K and 1K, and supplies a result of this calculation, i.e., information "6K", to the next address register 112. Thus, information "6K" is held in the next address register 112 in this case.

The information is held in each register in the above-described manners.

Information "4K", information "0K", and information "6K" are supplied to the 4K boundary determination circuit 102 as the maximum transfer size, the remaining transfer size, and the read start address, respectively. Therefore, in this case, data of 0K bytes (corresponding to the remaining transfer size) is to be read, starting with a read start address of 6K. In other words, data that exists between address 6K and address 6K, i.e., 0K bytes of data, is the data to be transferred.

Since 4K is the boundary in this case, the data existing between 6K and 6K does not extend across the 4K boundary. Therefore, information "False" is outputted as determination A. In addition, since the data does not extend across the 4K boundary, the remaining requested transfer size is outputted as requested transfer size A. Therefore, 0K is supplied to the priority determination circuit 105.

At time t5, information "1K" is supplied from the accumulation size register 111 to the buffer boundary determination circuit 103. In this case, the buffer boundary determination circuit 103 determines that the buffer size is not exceeded, and outputs information "False" as determination B. In addition, since 1K bytes of data can be stored in the buffer memory 45 in this case, information "1K" is outputted as requested transfer size B.

At time t5, information "4K" is supplied from the maximum transfer size determination circuit 101 (FIG. 7) to the transfer size determination circuit 104, and information "0K" is supplied from the remaining size register 110 to the transfer size determination circuit 104. The transfer size determination circuit 104 determines whether or not the transfer size is equal to or less than the maximum transfer size. Since the transfer size is 0K and the maximum transfer size is 4K in this case, the transfer size determination circuit 104 outputs information "True" as determination C. In the case where information "True" is outputted, the value of the transfer size supplied, i.e., information "0K" in this case, is outputted as requested transfer size C.

As described above, at time t5, information "False", information "False", and information "True" are supplied to the priority determination circuit 105 as determinations A, B, and C, respectively. Thus, since two or more pieces of information "True" have not been supplied to the priority determination circuit 105, the priority determination circuit 105 outputs, out of the requested transfer sizes supplied, requested transfer size C as the final requested transfer size. Therefore, 0K is set as the requested transfer size in this case.

The fact that 0K is set as the requested transfer size means that all the data that should be transferred has already been transferred. Accordingly, the procedure related to data transfer is finished.

As described above, in the present embodiment, when data transfer is performed, the restrictions at the time of data transfer are taken account of on the part of the DMA controller 44 (FIG. 2). The present embodiment, in which data transfer is performed in such a manner, produces the following effects.

In a serial bus, such as the PCI Express, the use of a larger payload size is desirable for improving transfer efficiency of the bus. In the present embodiment, an optimum payload size can be selected each time a process of data transfer is performed, so that as large a payload size as possible can be used. Thus, the transfer efficiency can be improved.

In addition, the need for the host system 22 to take account of the 4K byte boundaries or the boundary of the transfer buffer is eliminated. Further, data transfer can be performed within limits of the memory secured in the host system 22, free from hardware constraints.

Request Address and Request Size can be described in the entry or the link list. Thus, the host system 22 is capable of generating the link list while setting a desired transfer size without the need to take account of restrictions 1 to 4.

Suppose, for example, that writing of a video stream is to be written, and that the storage system 21 according to one embodiment of the present invention is connected to the host system 22. If data whose size is smaller than the buffer size is prepared in the host system 22, and the host CPU 61, which is provided in the host system 22 and handles the data until subsequent data is prepared, has spare capacity, the data can be written continuously to the storage without the need to wait for the data to be accumulated up to the buffer size. Such a flexible process becomes possible.

Still further, it becomes easy to allow amounts of data to be written to be distributed evenly, and it becomes possible to avoid a situation in which a large amount of data needs to be transferred at a time. As a result, the use of a CPU whose maximum throughput is relatively low becomes possible, for example. This will be very effective with a host system (e.g., a camcorder) that records videos. This is also true with reading.

Even when there is data whose size is smaller than the buffer size, Request Address and Request Size can be notified to the storage system 21 while such data is taken account of. In this case, the storage system 21 handles an optimum size, so that the processing demanded in the host system 22 is reduced. In other words, in the case of the storage system 21 in related art, a hardware structure of the storage system 21 needs to be taken into account at the time of data transfer. Therefore, in related art, the host system 22 needs to exercise control so that data to be transferred is split in accordance with the storage system.

Split control is described in the link list. Application of the present embodiment makes it possible to reduce the number of entries in the link list. That is, the application of the present embodiment makes it possible to save a memory area used for storing the link list in the host system 22.

In packet-based communication, packet information, parity, and so on need to be added along with net data. Since the data size of this packet information does not depend on the size of the net data, it is desirable that the size of the net data is as large as possible in order to improve the efficiency in data transfer. If the net data is divided into smaller parts for data sending and receiving, the packet information will increase in size in proportion to the degree of the division of the net data, resulting in a reduction in efficiency (packet overhead).

According to the present embodiment, however, the processing is performed in the above-described manners. Therefore, even when the division of the data is unavoidable for data transfer, communication can be performed with a maximum data amount. Thus, the issue of how to achieve efficient data division and transfer can be settled.

As described above, the application of the present embodiment produces various effects.

[On Storage Medium]

The above-described series of processes can be performed by either hardware or software. In the case where the series of processes are performed by software, a program that constitutes the software and which is stored in a program storage medium is installed into a computer having a dedicated hardware configuration or, for example, a general-purpose personal computer that, when various programs are installed therein, becomes capable of performing various functions.

Figure 13:
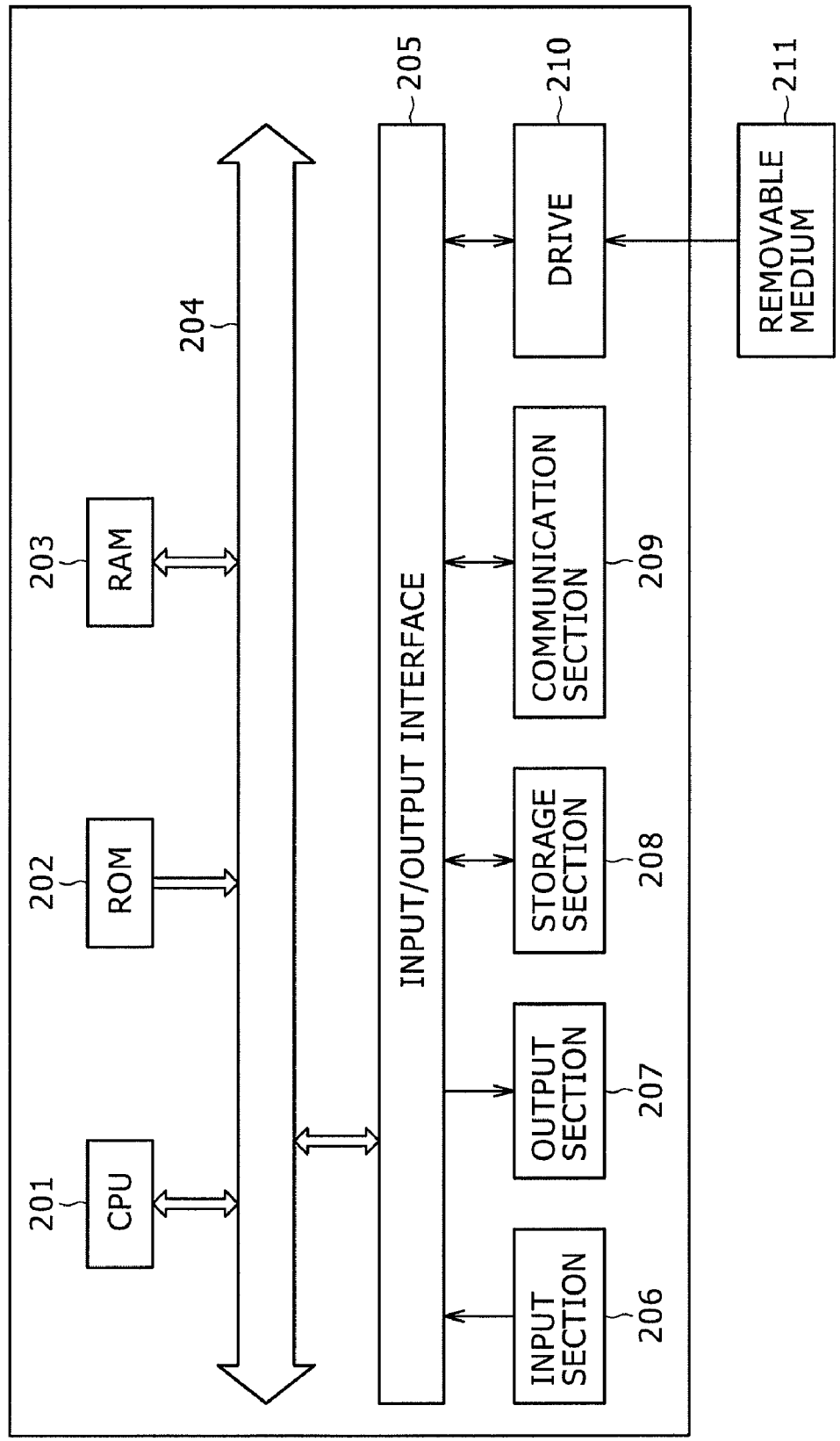
FIG. 13 is a diagram for describing a storage medium.

FIG. 13 is a block diagram illustrating an exemplary hardware structure of the personal computer that performs the above-described series of processes in accordance with the program.

In this computer, a Central Processing Unit (CPU) 201, a Read Only Memory (ROM) 202, and a Random Access Memory (RAM) 203 are connected to one another via a bus 204.

An input/output interface 205 is also connected to the bus 204. To the input/output interface 205 are connected: an input section 206 formed by a keyboard, a mouse, a microphone, or the like; an output section 207 formed by a display, a loudspeaker, or the like; a storage section 208 formed by a hard disk, a nonvolatile memory, or the like; a communication section 209 formed by a network interface or the like; and a drive 210 that drives a removable medium 211 such as a magnetic disk, an optical disk, a magneto-optical disk, or a semiconductor memory.

In the computer having the above structure, the CPU 201 loads the program, which is stored in the storage section 208, for example, into the RAM 203 via the input/output interface 205 and the bus 204 and executes the program to perform the above-described series of processes.

The program executed by the computer (i.e., the CPU 201) may be stored in the removable medium 211, which is a packaged medium formed by the magnetic disk (including the flexible disk), the optical disk (including a CD-ROM (Compact Disc-Read Only Memory), a DVD (Digital Versatile Disc), and the like), the magneto-optical disk, or the semiconductor memory, so that the program can be provided to the computer via the removable medium 211. Alternatively, the program may be provided to the computer via a wired or wireless communication medium such as a local area network, the Internet, or digital satellite broadcasting.

The program can be installed into the storage section 208 via the input/output interface 205 when the removable medium 211 is mounted on the drive 210. Also, the program can be received by the communication section 209 via the wired or wireless communication medium and installed into the storage section 208. Alternatively, the program may be installed in the ROM 202 or the storage section 208 beforehand.

Note that the program executed by the computer may be either a program that causes the processes to be performed chronologically in the order in which they have been described in the present specification, or a program that causes some of the processes to be performed in parallel or performed at appropriate times, such as when a call has been issued.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   setting means for setting, as a maximum transfer size, a maximum transfer size at the time of reading or a maximum transfer size at the time of writing set in connection with another apparatus;
   calculation means for subtracting a second data amount from a first data amount to calculate a third data amount, the first data amount being an amount of data to be transferred, the second data amount being an amount of data that has been transferred;
   boundary determination means for determining whether, if data whose amount is the third data amount is transferred, this transfer will involve a page boundary being extended across;
   transfer size determination means for determining whether or not the third data amount is equal to or less than the maximum transfer size set by said setting means;
   buffer boundary determination means for determining whether, if the data whose amount is the third data amount is transferred, this transfer will involve a buffer size being exceeded; and
   data amount means for determining a data amount of data to be transferred within limits of the third data amount, based on determinations made by two or more of said determination means.

2. The information processing apparatus according to claim 1, wherein
   said boundary determination means calculates a difference between a read start position and the page boundary, and
   said determination means determines the smallest value of the difference, and the third data amount to be the data amount of the data to be transferred.

3. The information processing apparatus according to claim 2, wherein said determination means determines the smallest value of the difference and the third data amount to be the data amount of the data to be transferred, when the first determination and the second determination are positive.

4. The information processing apparatus according to claim 1, further comprising a direct memory access controller for controlling data transfer such that data whose data amount is the data amount determined by said determination means is transferred.

5. The information processing apparatus according to claim 1, wherein said calculation means calculates a new third data amount while regarding the data amount determined by said determination means and the third data amount as the second data amount and the first data amount, respectively, to update the third data amount to the new third data amount, and continues this updating until the third data amount reaches zero.

6. The information processing apparatus according to claim 5, wherein an initial value of the first data amount is provided from the other apparatus.

7. An information processing method, comprising the steps of:
   setting, as a maximum transfer size, a maximum transfer size at the time of reading or a maximum transfer size at, the time of writing set in connection with another apparatus;
   subtracting a second data amount from a first data amount to calculate a third data amount, the first data amount being an amount of data to be transferred, the second data amount being an amount of data that has been transferred;
   determining whether, if data whose amount is the third data amount is transferred, this transfer will involve a page boundary being extended across;
   determining whether or not the third data amount is equal to or less than the maximum transfer size set in said setting;
   determining whether, if the data whose amount is the third data amount is transferred, this transfer will involve a buffer size being exceeded; and
   determining a data amount of data to be transferred within limits of the third data amount, based on results of two or more of said determinations.

8. A non-transitory computer-readable record medium, encoded with a program that, when executed, performs a method comprising the steps of:

setting, as a maximum transfer size, a maximum transfer size at the time of reading or a maximum transfer size at the time of writing set in connection with another apparatus;

subtracting a second data amount from a first data amount to calculate a third data amount, the first data amount being an amount of data to be transferred, the second data amount being an amount of data that has been transferred;

determining whether, if data whose amount is the third data amount is transferred, this transfer will involve a page boundary being extended across;

determining whether or not the third data amount is equal to or less than the maximum transfer size set in said setting;

determining whether, if the data whose amount is the third data amount is transferred, this transfer will involve a buffer size being exceeded; and determining a data amount of data to be transferred within limits of the third data amount, based on results of two or more of said determinations.

9. An information processing apparatus, comprising:

a setting section configured to set, as a maximum transfer size, a maximum transfer size at the time of reading or a maximum transfer size at the time of writing set in connection with another apparatus;

a calculation section configured to subtract a second data amount from a first data amount to calculate a third data amount, the first data amount being an amount of data to be transferred, the second data amount being an amount of data that has been transferred;

a boundary determination section configured to determine whether, if data whose amount is the third data amount is transferred, this transfer will involve a page boundary being extended across;

a transfer size determination section configured to determine whether or not the third data amount is equal to or less than the maximum transfer size set by said setting section;

a buffer boundary determination section configured to determine whether, if the data whose amount is the third data amount is transferred, this transfer will involve a buffer size being exceeded; and a data amount section configured to determine a data amount of data to be transferred within limits of the third data amount, based on determinations made by two or more of said determination sections.

* * * * *